May 10, 1938.  F. H. OWENS  2,117,254
CONTROL MEANS
Original Filed April 28, 1933   9 Sheets-Sheet 1

INVENTOR.
FREEMAN H. OWENS.
BY
*Philip S. Hopkins*
ATTORNEY

May 10, 1938.   F. H. OWENS   2,117,254
CONTROL MEANS
Original Filed April 28, 1933   9 Sheets-Sheet 2

INVENTOR.
FREEMAN H. OWENS.
BY
ATTORNEY.

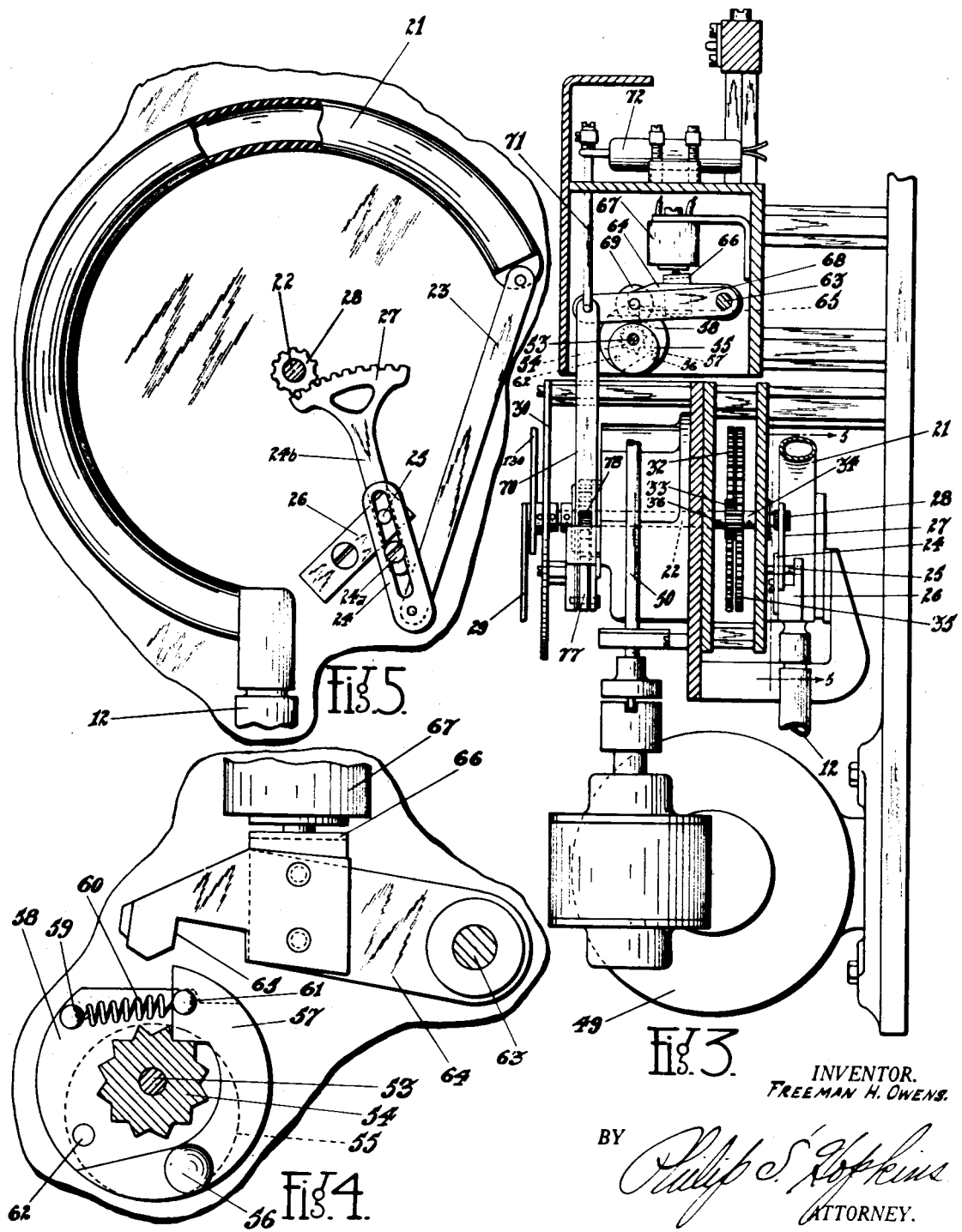

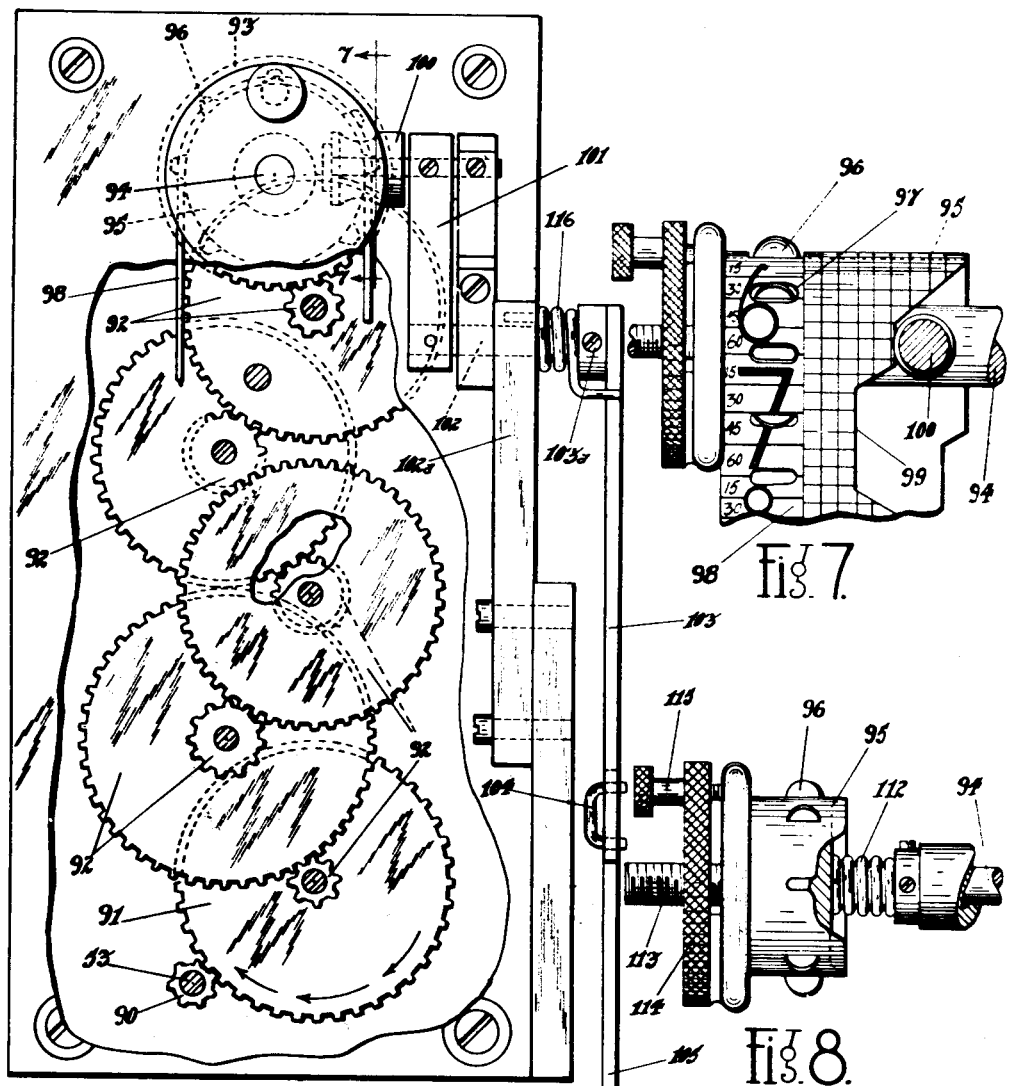

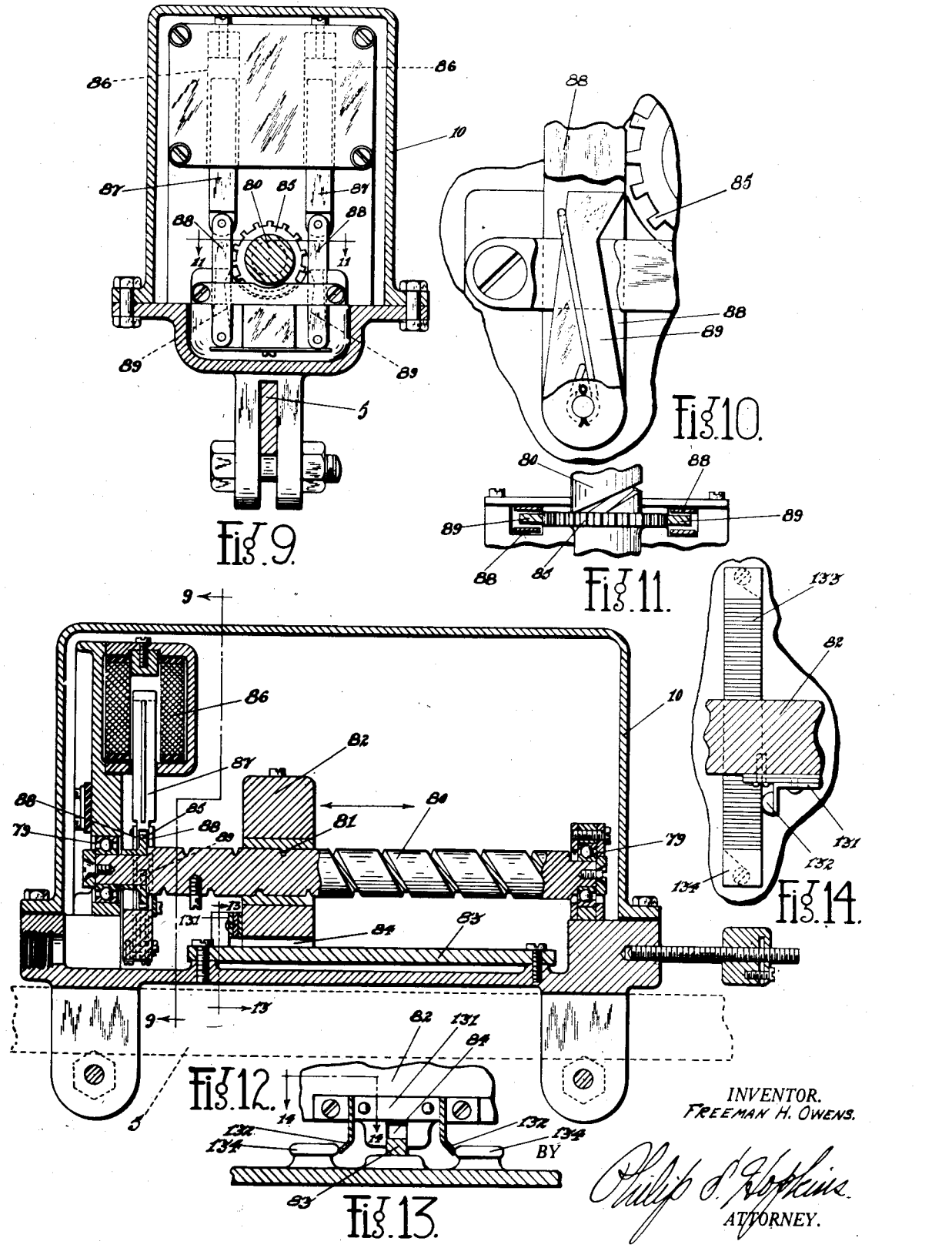

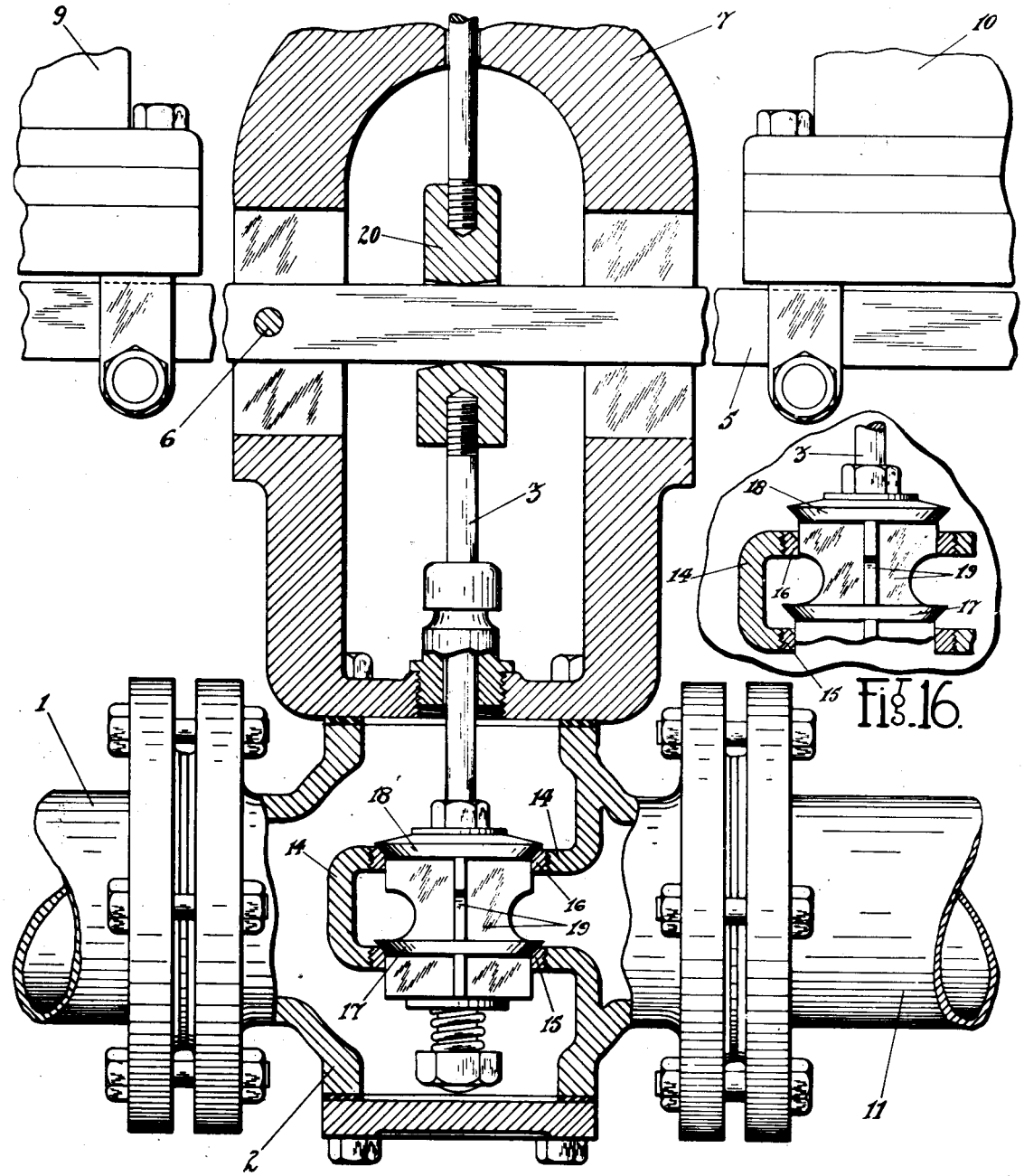

May 10, 1938.  F. H. OWENS  2,117,254
CONTROL MEANS
Original Filed April 28, 1933  9 Sheets-Sheet 7

INVENTOR.
FREEMAN H. OWENS.
BY
ATTORNEY.

May 10, 1938.   F. H. OWENS   2,117,254
CONTROL MEANS
Original Filed April 28, 1933   9 Sheets-Sheet 8
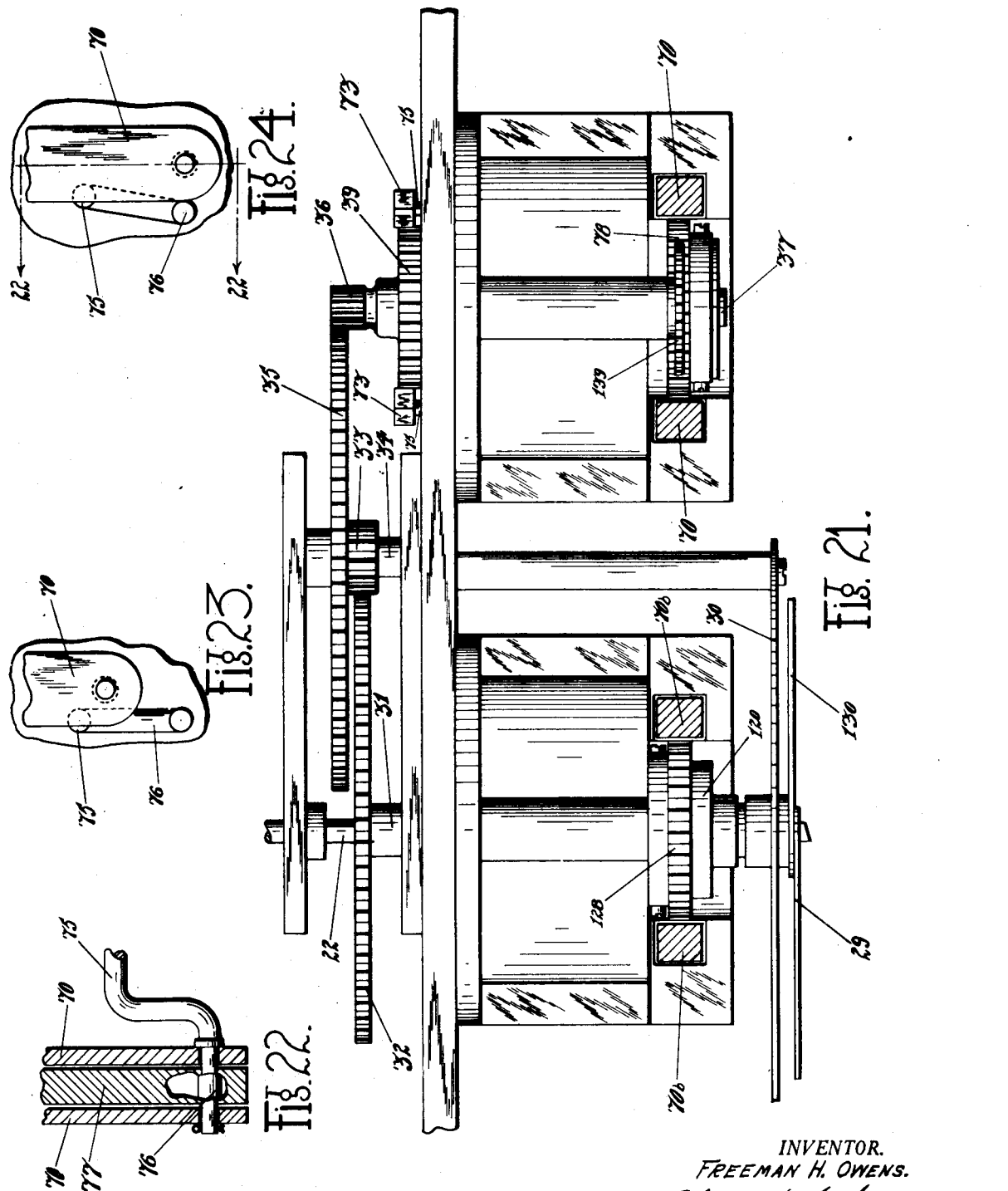
INVENTOR.
FREEMAN H. OWENS.
BY
ATTORNEY.

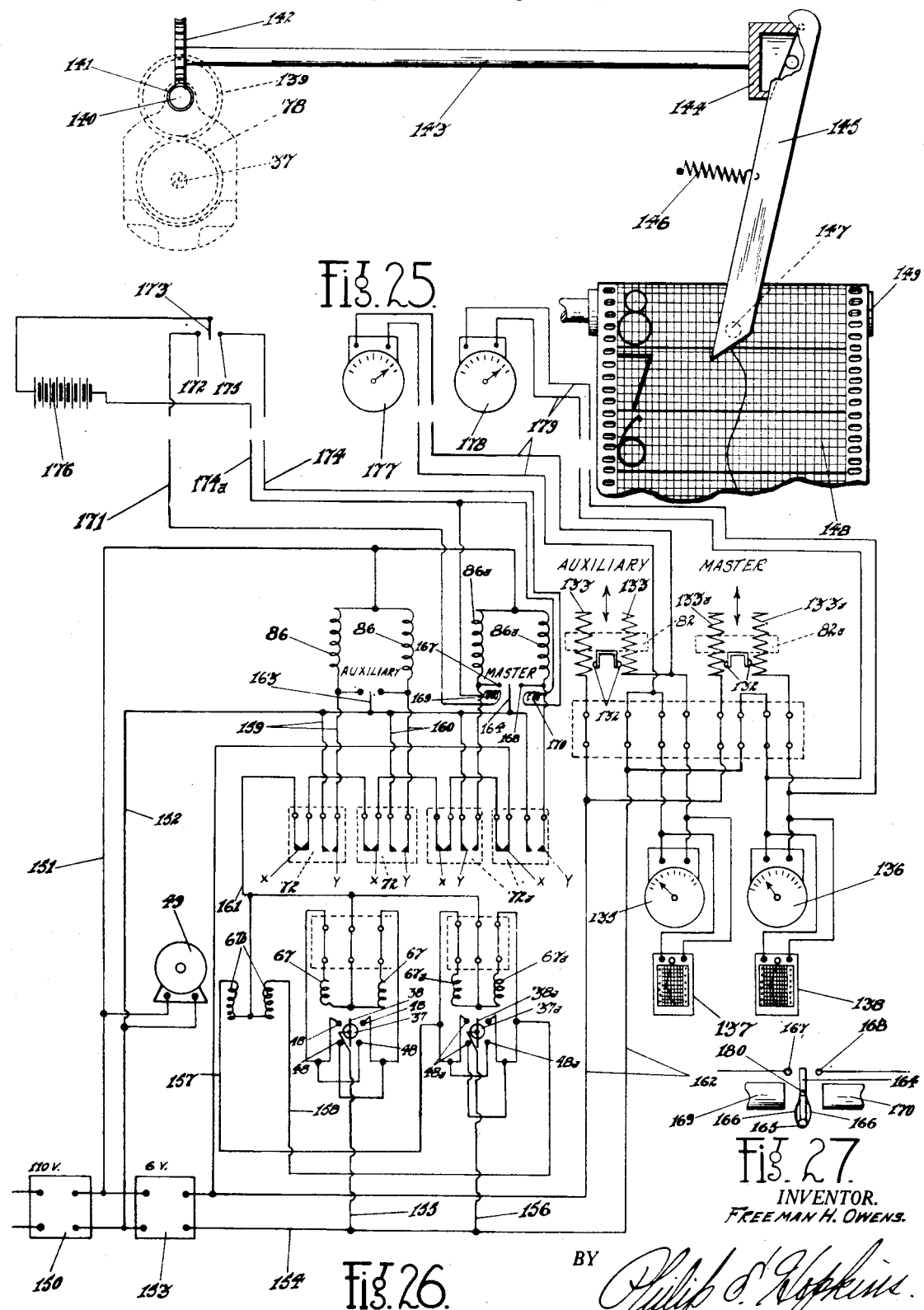

Patented May 10, 1938

2,117,254

UNITED STATES PATENT OFFICE 2,117,254

CONTROL MEANS

Freeman H. Owens, New York, N. Y.

Application April 28, 1933, Serial No. 668,473
Renewed October 7, 1937

18 Claims. (Cl. 50—10)

My invention relates to control means and particularly to an automatic control for valves used in steam lines and the like and designed to automatically regulate and maintain the desired pressure in the various outlets of a steam line.

As the description of the invention proceeds, it will be obvious that the invention is equally adaptable to other uses than steam pressure control, such as other fluid or air lines. It will also be apparent that the controlling means per se, is adaptable for use in other arts and for other purposes than valves. Inasmuch as the controlling device is particularly adaptable for valve controlling action, it has been so illustrated and described herein.

Primarily the invention comprises a controlling and adjusting means for a pivoted lever, the angular positions of which determine the adjustment of the device under control. For instance, when used as a valve control as illustrated herein, the pivoted lever by variations in its position about its pivot point controls the position of the valve with respect to its seat in order to regulate the amount of flow through such valve.

Before entering upon a detailed description of the invention, one particular use thereof will be described as an aid to the understanding of the application of the invention. There are many places such as large factories where steam is used to a large extent both for heating and for power purposes. Usually there is a plant furnishing steam in large quantities which is piped to various buildings and to various rooms in the buildings where it is drawn from the main line and applied for whatever purposes required. It is a real problem of economy as well as in effective operation that the steam pressure at the various outlets or points of use be kept under constant and accurate control. Particularly is it important in many instances, that an absolute uniform pressure be maintained during certain periods of operation of the factory. Also it is highly desirable and important that periodical changes in pressure be made at certain outlets such as for instance when the factory shuts down at night, as the steam requirements are not so high and the pressure can be reduced. In other words, there are generally fairly well defined periods during which maximum and minimum steam pressure requirements are called for, and often with intermediate stages.

I have provided a valve controlling means which fully meets these problems and provides first an outlet and sensitive control whereby the pressure in a given line is automatically maintained at a uniform pressure and also which automatically and periodically, at predetermined intervals, changes the pressure in accordance with requirements.

An important feature of my invention lies in the fact that regardless of the major change in pressure due to the periodic control, a controlling device operates to always maintain the pressure at its adjusted amount. In other words, if the pressure at a certain period is 10 lbs., my controlling device maintains that pressure accurately. If the pressure is reduced to 5 lbs. my invention likewise then maintains the pressure at 5 lbs.

One of the features of my invention lies in the provision of an ingenious mechanism, controlled from a pressure gauge, for automatically maintaining the desired pressure in the outlet side of a steam line and which includes an electric contact maker and breaker operable in either direction and which actuates a weight shifting means on the valve controlling lever to regulate the valve opening to compensate for such variations as may occur normally in the use of the steam line.

The second important feature of my invention lies in a time controlling device which at predetermined intervals also actuates another weight on the valve arm for changing the valve opening to permit increased or decreased pressure flow on the outlet side of the valve.

My invention is adaptable for use with a valve of the balanced type, that is, a valve provided with double seats and valve surfaces together with passages for the admission of pressure alike to corresponding valve surfaces whereby the valve is balanced by the pressure itself at the adjusted position so that the weighted lever which regulates the position of the valve disk members with respect to their valve seats merely maintains and regulates the valve disk members in such balanced position.

There are many detailed objects and advantages as well as novel features of my invention which will appear as the description proceeds, such as the contact maker and breaker device, the weight shifting means actuated thereby, the locking means for the contact maker and breaker, the timed controlling device and other elements and features.

My invention eliminates the necessity for the well known, troublesome diaphragm control for valves, in common use for years.

Referring now to the drawings forming a part of my invention and wherein like reference numerals indicate like parts:

Figure 3 is a sectional view taken on the line 3—3 of Figure 2.

Figure 4 is a detail view illustrating the releasing device actuated by the contact maker and breaker.

Figure 5 is a detail view illustrating the type of pressure gauge adaptable for this invention.

Figure 6 is a side view of the timing control device, certain parts being broken away for clearness.

Figure 7 is a detail sectional view taken on the line 7—7 of Figure 6 and illustrating the timing strip.

Figure 8 is a detail view similar to Figure 7 but omitting the timer strip for clearness.

Figure 9 is a detail sectional view of one of the weight devices used in connection with the valve lever, taken on the line 9—9 of Figure 12.

Figure 10 is a detail view illustrating the weight moving device.

Figure 11 is a detail sectional view taken on the line 11—11 of Figure 9.

Figure 12 is a detail sectional view through one of the weight mechanisms on the valve lever.

Figure 13 is a detail sectional view taken on the line 13—13 of Figure 12.

Figure 14 is a detail sectional view taken on the line 14—14 of Figure 13.

Figure 15 is a sectional view of a balanced valve such as my controlling device is adapted for, and illustrating the regulating lever in connection therewith.

Figure 16 is a detail view of the valve itself in open position.

Figure 21 is a top plan view of the actuating means between the pressure gauge pointer and the contact maker and breaker, and including a top plan view of an indicating mechanism and the contact maker and breaker, taken on the line 21—21 of Figure 2.

Figure 22 is a detail sectional view of the lower end of the actuating lever taken on the line 22—22 of Figure 24.

Figure 23 is a detail front view thereof in its upper position.

Figure 24 is a detail view of the lower end of one of the actuating levers in its lowered position.

Figure 25 is a detail view illustrating a recording attachment for my apparatus.

Figure 26 is a diagrammatic illustration of the electrical circuits involved in my invention as illustrated and described herein.

Figure 27 is a detail view illustrating the switch member for manual and remote control.

Figure 1:
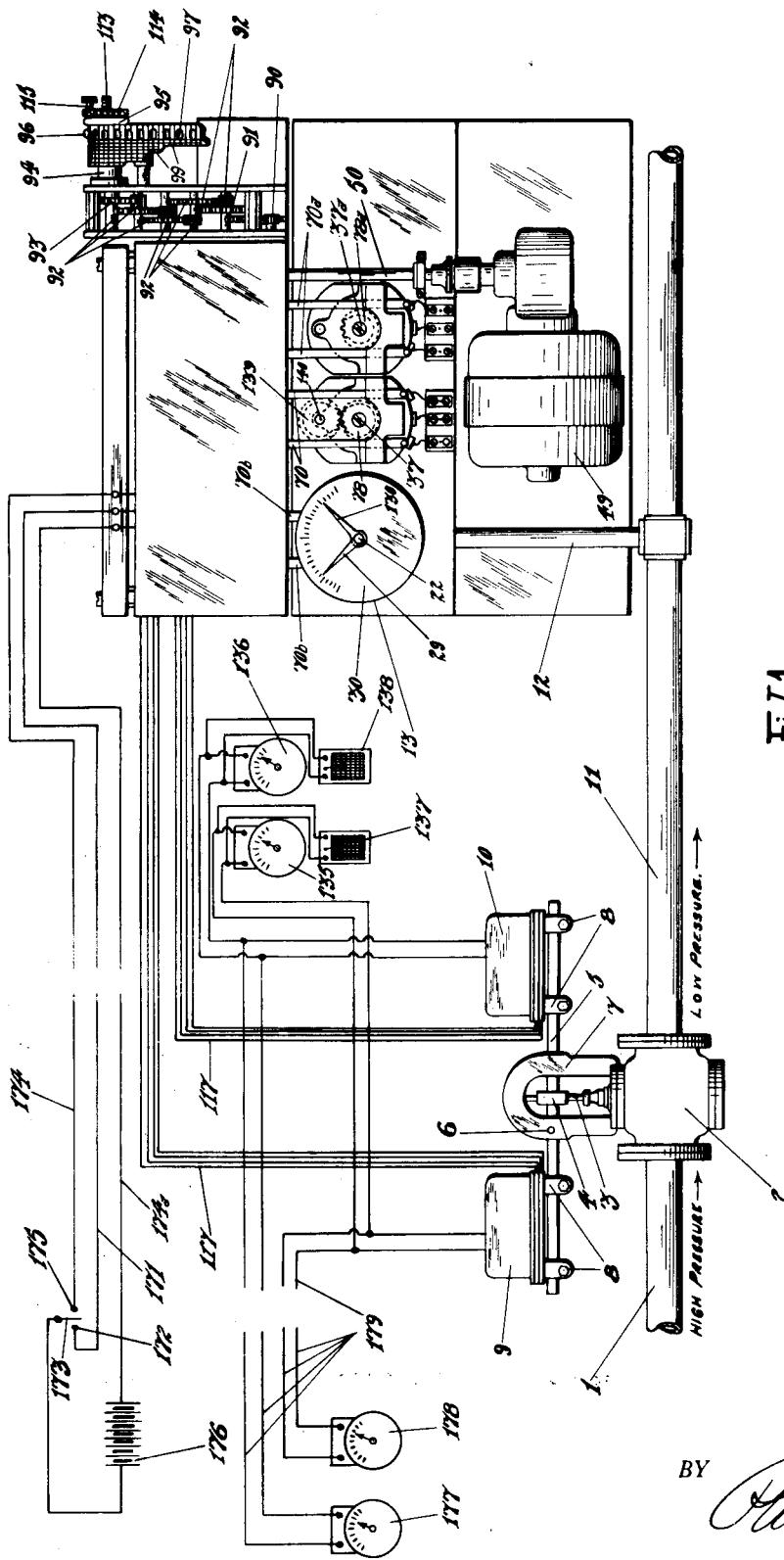
Figure 1 is a general view somewhat diagrammatic, illustrating the application of my invention to a steam pressure line.

Referring now more particularly to the figures and first to Figure 1 of the drawings, the reference character 1 indicates the inlet pipe of a steam pressure line connected with any suitable source of steam pressure. This pipe communicates with a valve generally indicated at 2 and the details of which will be later described. Suffice it to say at this point, that the valve is a "balanced" valve and is provided with the upwardly extending valve stem 3 with which is engaged as at 4 a lever 5 pivoted at 6 to a guide bracket 7 provided on the valve casing. Suitably secured to the lever 5 as by the fastening means 8, and on opposite sides of the pivot 6 of such lever are weight housings 9 and 10 respectively. The purpose and the construction of the mechanism in these housings will appear as the description proceeds, it being sufficient at this point to simply note that in each housing there is provided a weight member adapted to be moved longitudinally of the lever in order to influence the position of the lever on its pivot 6.

The pipe 11 communicates with the outlet side of the valve 2 and runs to any desired point or points of steam use such as heating appliances, steam power devices or other ultimate outlets where the steam passing through this pipe 11 may be utilized.

Interposed in this outlet pipe 11 at any desired point and communicating therewith is a pipe 12 leading to a pressure gauge indicated generally at 13 and the details of which will appear as the description proceeds.

So far it will thus be seen that I have provided a valve in a steam line provided with weight regulating means for the valve and a pressure gauge in the outlet side of the line to indicate the pressure therein. The description will now proceed to the controlling and actuating means for the valve controlling weights whereby in response to pressure changes the position of the valve will be automatically adjusted to compensate for such changes in order to maintain a uniform pressure, and also to the timing mechanism for causing major changes in the position of the valve in order to periodically and automatically vary the pressure in the outlet pipe 11.

With reference now to Figure 15 of the drawings, it will be noted that within the valve casing 2 there is provided a supporting bracket 14 of substantially U-shape, the lower and upper sides of which are provided with open seats 15 and 16 respectively, cooperating with the valve disks 17 and 18 respectively, carried on the lower end of the valve stem 3. This valve structure is provided with the usual guiding webs 19 and is adapted upon the raising or lowering of the valve stem 3 to move the disks 17 and 18 away from or towards the seats 15 and 16 whereby to adjustably admit the steam or other fluid past the disks and to the outlet side of the valve. The details of this valve and its assembly and associated parts are well known in the art and need not be further described.

The upper end of the valve stem 3 is provided with a lever engaging member 20 through which the lever 5 passes and by virtue of which the lever is rendered operative with relation to the valve. Obviously rocking the lever 5 on its pivot 6 will result in adjusting the position of the valve rings 17 and 18 with respect to their seats.

With this type of valve it will be clear that the pressure admitted to the valve casing through the pipe 1 will exert its energy equally against the top surfaces of the valve disk 18 and the lower surface of the valve disk 17 and also if the valve is in open position, as illustrated in Figure 16, the pressure admitted through the valve seats will exert itself equally against the underside of the valve disk 18 and the upper side of the valve disk 17. This obviously results in a balanced condition of the valve assembly so that very little force is required on the lever 5 to change the valve adjustment. The weight members on the lever 5, hereinafter described more fully, are so adjusted with respect to the pressures for which the valve is used, that they contribute to this balanced condition.

Referring now to Figures 3, 4, and 5 of the drawings, the pressure gauge illustrated is a common type of pressure responsive mechanism including the expansible tube 21 communicating with the pipe 12 whereby the expansion of the tube 21 is translated into rotation of a pointer shaft 22 by means of a link 23 fastened at one end to the closed end of the expansible tube 21 and at its opposite end to a slotted link 24. This slotted link 24 is secured as at 24a to the link 24b pivoted as at 25 to a fixed bracket 26 and carrying a toothed rack segment 27 meshing with a pinion 28 on the pointer shaft 22. Secured to the end of the pointer shaft 22 is a pointer 29 which is movable over the face of a dial 30 graduated in proper units, such as pounds and ounces, whereby the pressure as it affects the gauge tube 21 is indicated on the dial.

Figure 2:
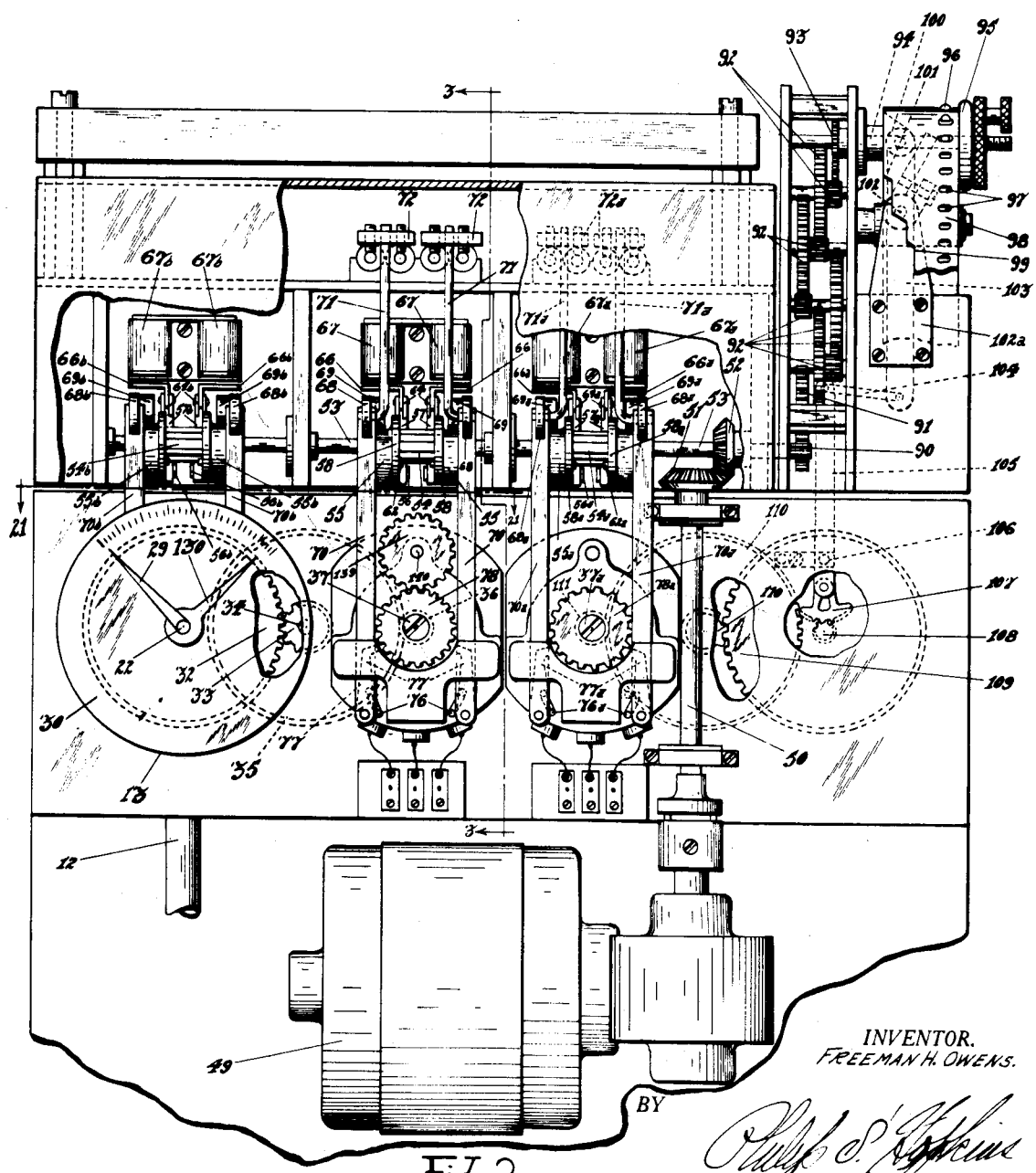
Figure 2 is a detail view of the general front assembly of the parts of my invention, certain parts being broken away for clearness of illustration.

With reference now to Figures 2, 3, and 21, it will be noted that there is mounted upon the pointer shaft 22 and keyed thereto for rotation therewith, a bushing or collar 31 (see Figure 21) upon which is suitably mounted a gear 32 meshing with a pinion 33 upon a stub shaft 34 upon which is also mounted a gear 35 meshing with a pinion 36 secured upon one end of a shaft 37. Obviously therefore, upon rotation of the pointer shaft 22 responsive to a change in pressure in the line, the shaft 37 will be rotated in one direction or the other depending upon whether the pressure gauge responds to an increase or a reduction in pressure, the gear train just described providing the communicating means of the movement from the pointer shaft to the shaft 37.

The shaft 37 which is directly responsive to the changes in pressure of the pressure gauge, through the medium of the gear train just described and including the pinion 36 on the end of such shaft 37, forms an important part of the electrical contact maker and breaker which, as the description proceeds, will appear as a vital controlling factor in the operation of this invention.

Suitably fixed upon the shaft 37 (see Figures 17 and 18) and properly insulated therefrom, are a plurality of contact members 38, there being shown three of these members although more or less may be provided if desired. These contact members 38 are preferably short extensions of a strip of a conducting material extending on both sides of the shaft 37, and may be formed as a single stamping. These contact members will hereafter be referred to as vanes. Pinned upon one end of the shaft 37, adjacent the pinion 36, is a ratchet wheel 39 for a purpose to be described. Suitably seated adjacent each end of the shaft 37 for rotation therewith, are bushings 40 provided with grooves 41 engaging ball bearings 42 which also engage within similar grooves 41a provided in bushings 43 comprising the end members of a cylindrical drum 44 surrounding the shaft 37 and within which the shaft 37 is rotatable as previously described.

The drum or cylinder 44 is provided on its outer surface with bushings 45 provided with grooves to receive ball bearings 46 also engaging within grooves provided in the fixed supporting bracket 47, whereby the drum 44 is rotatably mounted on the ball bearings 46 in order that it may rotate around and independently of the shaft 37. The means for causing the cylinder or drum to rotate will be more fully pointed out later.

Suitably mounted on the drum 44 and properly insulated therefrom, are a plurality of contact pins 48, the lower ends of which project through the drum and extend thereinto in the path of movement of the contact vanes 38. There are four sets of these contact pins 48, one set being positioned on each side of each end of the vanes 38, as clearly illustrated in Figure 17. The position of these contact pins 48 with respect to the vanes 38 is such that if the shaft 37 is moved in either direction, both ends of the vanes will contact the pins 48 lying in their path. In other words rotation of the shaft 37 in either direction will immediately result in engagement of both ends of the vanes 38 with two sets of the contact pins 48.

It may be helpful to an understanding of the purpose of this mechanism to state at this point that the movement of the shaft 37 and consequently the vanes 38, in either direction by the pressure gauge results in making electrical contact through the contact pins 48 which results in setting in motion the weight shifting means to be described, whereby the position of the lever 5 is adjusted and consequently the valve opened or closed to permit an increase or decrease in pressure flow therethrough, depending upon the actuation of the gauge responsive to a pressure variation and such gauge action determining the direction of rotation of the shaft 37. Obviously the result intended is to cause a weight adjustment on the lever which will adjust the valve to compensate for the original variation in pressure in order that the desired pressure may be automatically restored and maintained.

Without going at this time into a detailed description and discussion of the electric circuits involved, and leaving for the moment further description of the contact maker and breaker and its operation, reference should now be had to Figure 2 of the drawings. In this figure it will be noted that there is provided preferably an electric motor 49, although any other source of continuous power may be provided, which motor drives a shaft 50 provided at its end with a miter gear 51 meshing with a miter gear 52 on a shaft 53. This shaft 53 is intended for continuous rotation, receiving its source of power from the motor 49. Fixedly mounted upon this shaft 53 at a plurality of spaced points are toothed ratchets 54 and 54a (see Figures 2 and 4). Also mounted upon the shaft 53 but rotatable thereon, and directly adjacent the ratchets 54 and 54a are the eccentrics or cams 55 and 55a respectively, pivoted to each of which at 56 is a pawl 57 and 57a respectively adapted to cooperate with the adjacent ratchet. Formed as an integral part of each of the cams 55 and 55a and offset laterally therefrom is a supporting member 58 and 58a respectively, each provided with an anchor bar 59. One end of a coil spring 60 is secured to each anchor bar and the opposite ends engage pins 61 on the pawls 57 and 57a whereby such pawls are normally urged into ratchet engaging position. These supporting members 58 and 58a are also provided with pins 62 and 62a respectively, lying in the paths of the pawls 57 and 57a to act as stops therefor in certain positions of actuation of said pawls as will hereinafter appear.

Pivoted as at 63 at a point adjacent the pawl 57 is a latch arm 64 notched at its free end as at 65 for cooperation with the free end of the pawl 57. This latch 64 is provided on its upper side with an armature member 66 whereby such latch may be attracted and lifted upwardly to the position shown in Figure 4 by an electromagnet 67. The normal position of these parts just described is as follows: The magnet 67 is normally not energized and therefore the latch 64 is in its lowermost position with its notched end 65 engaging the end of the pawl 57, in which position such pawl is held out of engagement with the ratchet 54 which rotates freely with the shaft 53. If, however, the magnet 67 is energized and the latch raised to the position shown in Figure 4, the pawl 57 will, under the influence of spring 60, engage the ratchet 54 and cause the cam 55 to rotate with the shaft 53 until the magnet 67 is de-energized and the latch again drops to pawl engaging position where it rides on the surface of the rotating pawl until the free end of the pawl reaches the end of the latch, whereupon it drops in front of the pawl and the same is disengaged from the ratchet 54 and the cam ceases to rotate with the shaft 53.

It should be stated here, and in connection with Figure 2, that for each contact maker and breaker of the vane and drum construction previously described which may be provided at various outlets in the steam line, there is provided the mechanism just described including the continuously rotating shaft 53 and two of the magnets 67 and two complete cam assemblies such as illustrated in Figure 4, preferably positioned directly adjacent each other whereby the pawls 57 may cooperate with a single ratchet 54. The reason for this duplication of magnets and cams will be apparent shortly.

To bring the operation of the mechanism so far described clearly to mind, let it be assumed at this point that a slight increase in pressure has occurred in the outlet pipe 11 and the gauge tube 21 has responded to such increase in pressure resulting, through the gear train described, in rotating the shaft 37 in one direction. Upon such rotation the contact vanes 38 engage the contact pins 48 lying in their path of movement in that direction, for instance, to the left in Figure 17, resulting in energizing one of the electromagnets 67, for example the left hand magnet in Figure 2. Such magnet when energized attracts the armature 66 of its corresponding latch 64 raising the same out of pawl engaging position whereupon the cam 55 is caused to rotate with the shaft 53 through the mechanism previously described.

If the pressure in the pipe 11 decreased instead of increased, the gauge tube 21 would respond to such decrease causing rotation of the shaft 37 in the opposite direction from that just described, whereupon the contact vanes 38 would engage the contact pins 48 on the opposite side of the vanes from those just described, resulting in energizing the magnet 67 on the right hand side in Figure 2 causing its corresponding latch 64 to be raised and its corresponding cam 55 to rotate with the shaft 53.

The releasing of either of these cams 55 to rotate with the shaft 53 brings about the following results.

Pivoted to the same pivot member 63 as the latch 64, there is provided for each of the cams 55 an arm 68 (see Figure 3) rotatably mounted upon which intermediate its ends is a roller 69 the periphery of which rides upon the periphery of the cam 55. Secured to the free end of the arm 68 is a vertically disposed bar 70 adapted to be raised or lowered by the arm 68 when the same is raised or lowered by virtue of rotation of the cam. Each of the bars 70 is provided at its upper end with an upwardly projecting extension 71 cooperating with a contact maker and breaker 72 of any preferred type for a purpose to be described. At this point reference should again be had to Figures 2, 3, 18, 19, 22, 23, and 24 of the drawings, and particularly to the ratchet 39 on the shaft 37 of the contact maker and breaker previously described. Suitably pivotally mounted on each side of the ratchet 39 is a locking pawl 73 shown clearly in Figure 19. A coil spring 74, normally urges these locking pawls into engagement with the teeth of the ratchet 39. Carried by each of the locking pawls 73, however, is a laterally extending pin 75, the forward end of which is bent as at 76 to provide a crank arm normally engaging the lower inner edge of the corresponding bar 70. The positioning of these crank members 76 with respect to the lower ends of the bars 70 is such that with the bars in their normal lowermost position, as shown in Figure 2, the crank pins are rocked inwardly resulting in holding the locking pawls 73 out of engagement with the ratchet 39 against the tension of the spring 74. Thus, so long as the bars 70 are in their normal lowermost position, the shaft 37 of the contact maker and breaker is free to be rotated by the mechanism previously described.

If now one of the magnets 67 is energized through operation of the contact maker and breaker, the cam 55 corresponding to such magnet will be rotated with the shaft 53 and obviously rotation of such cam will result in raising the corresponding bar 70. The initial raising of such bar permits the crank pin 76 to rock on its pivot. As the bar 70 is raised away from the crank pin, it permits the corresponding locking pawl 73 to engage with the teeth of the ratchet 39 thus locking the shaft 37 against further rotation. The lower end of each of the bars 70 has pivoted thereto a pawl 77 (see Figures 2 and 3). The end of the drum 44 of the contact maker and breaker, opposite the ratchet 39, is provided on its outer surface with a toothed gear 78 adapted for cooperation with the pawls 77. In the normal lowermost position of the bars 70, these pawls 77 are out of engagement with the gear 78. Upon raising either of the bars, however, the pawl carried thereby engages with the teeth of such gear and rotates the drum 44 a sufficient distance to disengage the contact pins 48 from the contact vanes 38. It should be stated here that the operation of the locking pawls 73 on the vane shaft 37, and the pawls 77 with relation to the drum gear 78, is so timed that the locking operation of the shaft 37 is accomplished immediately prior to the rotation of the drum by the pawl 77. This is in order that there can be no further rotation of the shaft 37 until the drum has been moved to disengage the contact pins 48 from the vanes 38. Obviously immediately upon such operation of the contact pins and vanes, the magnet 67 will be de-energized resulting in the latch 64 dropping into locking engagement with the pawl 57 and disengaging the cam 55 from further rotation with the shaft 53. This cam 55 and the operation of this mechanism just described is so timed that from the initial energizing of the magnet 67, by virtue of the vane shaft moving its contact vanes into contact with the contact pins 48, until the cam is disengaged from the shaft again, is such that only one revolution of the cam 55 is accomplished. Obviously therefore, upon return of the cam to its normal position, the arm 68 and bar 70 return to their normal lowermost positions, whereupon the actuating pawl 77 is disengaged from the gear 78 and the locking pawl 73 is disengaged from the ratchet 39.

As previously explained the operation just described is the same in either direction of rotation of the shaft 37. The duplicate parts including the bars 70, cams 55, and actuating pawls 77, make possible the rotation of the drum in which ever direction the shaft 37 is rotated. By virtue of the ingenious construction of this contact maker and breaker it will be seen that repeated operations through wide changes in pressure either above or below normal will result in continued and repeated step by step movements of the shaft 37 and the drum 44, the drum following the rotation of the shaft in either direction step by step without limit as to such rotation.

With reference again to the extension arms 71, it may be explained that as they are raised with the arms 70, they actuate, in timed relation, the contact maker and breaker 72 cooperating therewith to break the circuit to the other magnet 67 whereby there can be no chance of that magnet being energized until the other has been de-energized. These contact makers and breakers also serve another purpose regarding the shifting of the weights in housings 9 and 10 as will hereinafter appear.

Referring now to Figures 1, and 9 to 13 inclusive, attention is again called to the weight housings 9 and 10 secured upon the opposite ends of the valve lever 5. Disregarding the weight housing 9 and its contents for the time being, specific reference will be made to weight housing 10. Suitably mounted in this housing are spaced bearings 79 of the ball type rotatably supporting a screw threaded shaft 80 positioned longitudinally of the housing and of the lever 5. Mounted upon this shaft 80 and provided with thread engaging teeth 81 is a weight 82 adapted for movement along the shaft in either direction depending upon the direction of rotation of such shaft. This weight is guided in its longitudinal movement by means of an upstanding rib 83 provided on the bottom of the housing 10 and engaging within a slot 84 in the lower end of the weight 82.

Fixed upon one end of the shaft 80 is a toothed sprocket 85 by means of which the shaft may be rotated in either direction. The rotating means for this shaft comprises a pair of solenoids 86, the armatures 87 of which are adapted to project downwardly on opposite sides of the sprocket 85. The lower ends of these armatures carry vertically disposed pivoted arms 88 to the lower ends of which are pivoted actuating pawls 89 adapted for engagement with the teeth of the sprocket 85.

The normal position of the armatures 87 of the solenoids is downwardly with the pawls 89 normally out of engagement with the sprocket. If either solenoid is energized, however, its armature 87 will be drawn upwardly resulting in the pawl 89 carried thereby engaging in its upward movement with a tooth of the sprocket 85 resulting in rotating such sprocket and the shaft 80 one step. When the solenoid is de-energized, its armature and the corresponding pawl 89 is again lowered out of sprocket engaging position.

The energizing of the solenoids 86 is brought about by the upward movement of the extensions 71 on the bars 70 cooperating with the contact makers and breakers 72 (see Figure 3). Likewise the solenoids are de-energized when such bars are again lowered by the operation previously described.

It will be clear that the direction of rotation of the shaft 80 depends upon which of the solenoids 86 is energized and this, of course, depends upon whether the pressure has increased or decreased, thus operating through the various agencies heretofore described, the contact maker and breaker comprising essentially the shaft 37 and the drum 44.

Obviously also movement of the weight 82 in one direction or the other on the shaft 80 results in a slight variation in the position of the valve lever 5 to increase or decrease the valve opening, depending upon the direction of such travel. For instance, if the normal pressure is set for 10 lbs. and such pressure drops the agencies just described will so operate as to move the weight to the left in Figure 1 to thus rock the valve lever 5 slightly upwardly on its pivot resulting in opening the valve to admit more pressure to the outlet pipe 11 in order to compensate for such decrease in pressure. The operation is identical if the pressure increases and thus the desired pressure is automatically maintained without the attention of operators and without regard to the variation in the use of the steam available in the outlet pipe 11.

As was pointed out generally in the introductory portion of this specification, this invention is so designed that in addition to automatically maintaining a predetermined pressure in a steam line, it may operate automatically to materially change the valve setting in order to provide a major change in pressure at predetermined intervals. This is useful where the steam requirements of, for instance, a factory, may change periodically or at predetermined intervals such as for instance when the factory shuts down at night and opens again in the morning.

To this end I have provided a second weight shifting mechanism for the valve lever 5 operable at selected predetermined intervals to produce a major change in the adjustment of the valve. This mechanism will now be described, particular reference being had to Figures 1, 2 and 6 to 8 inclusive.

The continuously driven shaft 53 (see Figure 2) is provided at one end with a pinion 90 meshing with a gear 91 forming the first of a series of gears and pinions 92 providing a speed reduction gear train, the last gear 93 of which is mounted upon a shaft 94 upon which is slidably and rotatably mounted, a toothed sprocket 95, the teeth 96 of which are adapted to engage in perforations 97 provided along one edge of a timer strip 98. One edge of the timer strip 98 is notched as at 99 to provide a cam-like edge adapted to be engaged by a roller 100 carried at the upper end of an arm 101 mounted at its lower end upon a pintle 102, supported by a bracket 102a. Also pivoted to this pintle 102 is the upper end of an arm 103 extending downwardly and having its lower end connected by a link 104 to the upper end of an arm 105 suitably pivoted at 106 and carrying at its lower end a toothed rack segment 107. Obviously therefore, the rocking of the arm 101 by virtue of the roller 100 riding into and out of the notches 99 of the timer strip, will cause the toothed segment 107 to oscillate about the pivot 106, the direction of oscillation depending, of course, upon the direction of movement of the roller 100 on the timer strip.

The toothed segment 107 meshes with a pinion 108. Mounted upon the shaft of this pinion is a gear 109 forming a part of a gear train with gears and pinions 110, the last of which comprises a pinion 111 on a shaft 37a corresponding in every respect to the contact vane shaft 37 of the contact maker and breaker previously described. For the sake of brevity and clearness, the details of this contact maker and breaker of which the shaft 37a is a part have not been shown inasmuch as they are identical in every respect with the contact maker and breaker previously described, and including the contact vanes, the rotatable drum, the contact pins on the drum, and all the other elements as clearly illustrated in Figures 17 and 18. In Figure 2 many of these duplicate parts are shown and will be referred to generally and designated with reference characters the same as those used on corresponding parts previously described but distinguished by the addition of the letter "a". These parts include the gear 78a for the drum of the contact maker and breaker, the arms 70a corresponding to the arms 70, the actuating pawls 77a cooperating with the gear 78a, the crank pins 76a corresponding to the crank pin 76 for controlling the locking means for the shaft 37a, the electromagnets 67a corresponding to the magnets 67, the upper extension 71a corresponding to the rods 71, and the contact devices 72a cooperating therewith. Likewise the ratchet 54a, the cams 55a, the pawls 57a, the supporting portion of the cams 58a, the stop pins 62a and the latch arms 64a. Many of these duplicate parts have been previously referred to.

The operation of this mechanism is exactly the same as that previously described for actuating the weight 82 in the housing 10 and as will appear shortly, this mechanism similarly actuates a weight within the housing 9.

Within the housing 9 on the valve lever 5 is an assembly of parts which is in every respect an exact duplicate of those shown and described in the housing 10. For clearness and for brevity and to avoid needless duplication of illustration and description, reference may be had to Figures 9 to 13 inclusive for these parts.

As before described actuation of either of the contact makers and breakers 72a results in energizing the corresponding solenoids in the housing 9 to shift the weight therein.

The operation of this part of the mechanism is as follows: The timer strip 98 is previously cut with the desired notches 99 in desired timed relation to the movement of the sprocket 95 so that at selected predetermined times such notches will result in rocking the roller 100 and the mechanism controlled thereby in the desired direction, such direction, of course, being determined by whether the pressure is to be increased or decreased through the valve. The timer strip is then engaged on the sprocket and allowed to be moved thereby through the gear train 92 driven from the shaft 53. This timer strip may be of an endless type or may be wound from one support to another, and is preferably charted in units of hours and minutes. As the roller 100 moves into a cam notch at a predetermined time the rack segment 107 is oscillated in the corresponding direction resulting in rotating the contact vane shaft 37a, through the gear train 110. From this point the operation is identical with that previously described in that the corresponding magnet 67a is energized, releasing the latch 64a, permitting the cam 58a to rotate and the arms 70a and 71a to be raised, incidentally locking the shaft 37a and immediately thereafter rotating the gear 78 of the contact maker and breaker drum to break the circuit to the magnet 67a, previous to which however, the appropriate contact 72a has been actuated to energize the appropriate solenoid in the weight housing 9 to cause the weight therein to shift in the desired direction. It will be understood, of course, that if the travel of the roller 100 is for a considerable distance in order that a major change in the position of the valve may be effected, the operation just described will be repeated a sufficient number of times to move the weight the desired distance, the length of travel of the weight depending upon the amount of movement of the roller 100 on the timer strip. Obviously the cam edges of the strip may be arranged regularly or irregularly depending upon the periods of change in pressure desired.

It will be clear that inasmuch as the various predetermined changes may be desired or required, there may be quite a number of timer strips made up and it will be obvious that in placing the timer strip on the sprocket 95, care must be used that it is so placed with relation to the gear train drive 92 that the effective notches or cam surfaces of the strip will arrive at the roller 100 at the proper times.

Also in order that the timer strip may be properly adjusted to the roller 100 at a given point when it is placed on the sprocket, the sprocket 95 is slidably keyed upon the shaft 94 against the tension of a spring 112 (see Figure 8). The shaft 94 is threaded at its outer end as at 113 to receive an adjusting ring 114 by which the sprocket 95 may be moved longitudinally of the shaft 94 against the tension of the spring to proper position with respect to the timer strip and roller. The sprocket is then locked for rotation with the shaft and adjusting flange 114 by means of the set screw 115.

It will also be observed particularly with reference to Figure 6, that on the pintle 102 there is provided a coil spring 116 which normally urges the arm 101 carrying the roller 100 into timer strip engaging position.

Figures 17, 18, 19, 20:
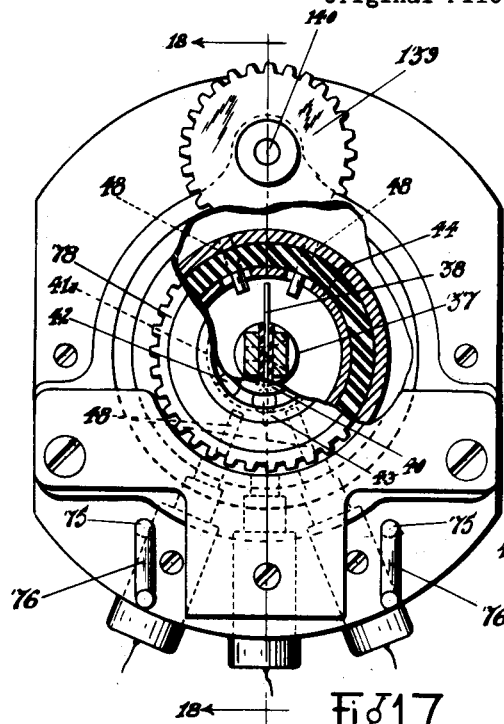
Figure 17 is an end view of the contact maker and breaker, certain parts being broken away and others shown in section, for clearness.
Figure 18 is a cross sectional view of the contact maker and breaker taken on the line 18—18 of Figure 17.
Figure 19 is a detail view of the locking device for the contact maker and breaker, taken on the line 19—19 of Figure 18.
Figure 20 is a top sectional view of an indicating means for showing the pressure in the line and the position of the predetermining regulating means.

Attention is now directed to Figures 2, 20, and 21, particularly the latter two. It will be noted that the pointer shaft 22 of the pressure gauge passes through a tubular sleeve 118 and projects beyond the face of the dial 30 over which the pointer 29 secured upon such shaft 22 is adapted to be moved. This sleeve 118 is rotatably mounted by means of the ball bearings 119 within a rotatable drum 120 also rotatably mounted in a fixed housing 121 by means of the ball bearings 122. Fixedly mounted just inside of the rear end of the housing 121 is a pinion 123 with which is adapted to mesh a pinion 124 mounted upon a sleeve 125a rotatable on a stub shaft 125 carried by the drum 120. The sleeve 125a also carries the pinion 126 meshing with a pinion 127 mounted upon the sleeve 118.

The drum 120 is provided at its front end with a toothed gear 128.

Referring now to Figure 2, it will be noted that there is mounted upon the rotating shaft 53, adjacent its left end in Figure 2, another set of elements which are duplicates in every respect of the two sets previously described. These elements include a toothed ratchet 54b, cams 55b, pawls 57b, pivoted latch members 64b, rollers 65b, links 68b, and armatures 66b carried by the latch members 64b. The details of these elements may be found by referring again to Figures 3 and 4 wherein are shown the corresponding elements designated by the same reference characters without the letter modification.

There are also provided electromagnets 67b corresponding in every respect to magnets 67 and 67a previously described and so positioned as to cooperate with the armatures 66b.

The pivoted links 68b are also provided adjacent their front ends with the downwardly extending pivoted rods 70b corresponding with the rods 70 and 70a and having at their lower ends pawls (not shown) corresponding exactly to the pawls 71 and 71a.

It will be understood that these pawls are so disposed as to cooperate with the teeth of the gear 128 on the drum 120 whereby when the rods 70b are raised by energizing one of the magnets 67b, the pawl on such rod will engage and rotate the gear 128 one step, then consequently rotate the drum 120 one step.

Rotation of the drum 120 carries with it the stub shaft 125 mounted on one end thereof and this movement of the stub shaft 125 with the drum 120, causes the pinion 124 on such stub shaft to rotate because of its engagement with the fixed pinion 123 and thus rotate the sleeve 125a on the stub shaft 125. This causes rotation of the pinion 126 mounted on such sleeve and this of course, results in rotation of the sleeve 118 upon which is the pinion 127 meshing with the pinion 126.

The forward end of the sleeve 118 is provided with a bushing 129 upon which is mounted a pointer 130 overlying pressure gauge 30. The electromagnets 67b are electrically hooked up in parallel with the magnets 67a so that each time one of the magnets 67a is energized by operation of the contact maker and breaker therefor and provided with shaft 37a, the corresponding electromagnet 67b will also be energized whereby to move the pointer 130 step by step in accordance with the movement of the contact maker and breaker shaft 37a. It will be recalled that the operation of this contact maker and breaker is brought about by periodical major changes in pressure through the actuation of the timing strip 98. Also that this circuit maker and breaker is the controlling means for the shifting weight in weight housing 9. It will be clear, therefore, that operation of the major pressure change apparatus will result in indicating by means of the pointer 130 over the dial 30, the pressure to which the valve 2 has been adjusted. This affords a check to the operator for by observing this pointer 130 periodically he can ascertain whether or not the proper major adjustments have been made through the timer strip 98.

Referring now again to Figures 12, 13, and 14, it will be observed that at one end of the weight 82 there is provided a supporting strap 131 carrying downwardly extending portions 132 engaging with electrical resistance coils 133 wound around guide members 134 on each side of the guiding rib 83. These resistance windings are suitably electrically connected with an electric meter or other indicator 135 (see Figure 26), such indicator being graduated in pounds pressure, whereby the position of the weight 82, translated into pounds pressure may be indicated at a remote point, such as the plant superintendent's office of a factory equipped with this apparatus. It will be understood, of course, that identical apparatus is provided in both of the weight housings 9 and 10 so that the position of both weights will be so indicated. In Figure 26 there is shown the indicator 135 corresponding to the weight 82 in the weight housing 10 and the indicator 136 corresponding to the weight in the weight housing 9.

I have provided and illustrated two separate means for recording the pressure changes resulting from the operation of my apparatus, either one or both of which may be used. The first is designed for use remote from the apparatus itself as for instance in the plant manager's office along with the indicators 135 and 136 and this recorder, one for each of the weight housings, may be an electrical recorder of any desired type tapped into the circuit of the indicators 135 and 136 as shown clearly in Figure 26. These electrical recorders are indicated at 137 and 138 respectively.

The other recorder is designed for use at the point where the controlling apparatus is mounted, namely, adjacent the outlet pipe of the steam line being controlled. Referring now again to Figure 2, and to Figure 25, it will be noted that mounted above the gear 78 of the first circuit maker and breaker described and meshing with such gear, is a gear 139 suitably mounted for rotation by the gear 78. This gear 139 rotates a shaft 140 upon which is provided a worm 141 meshing with which is a worm gear 142 on a shaft 143, the opposite end of which is provided with a cam member 144 cooperating with a pivoted lever 145 normally urged in one direction by a spring 146 and the free end of which lever carries a recording element 147 for marking on a movable strip 148, a sprocket 149 being provided for moving such strip.

It will be understood, of course, that if desired one of these recording devices may be provided for each one of the step by step circuit makers and breakers which may be identified by the shafts 37 and 37a and the gears 78 and 78a. For clearness, however, only one has been shown.

In Figure 1 of the drawings I have indicated a series of wires 117 as indicating the electrical connections between the weight housings and the control apparatus and reference should now be had to Figure 26 in which is diagrammatically illustrated the wiring system and electrical means of the apparatus. For convenience I will refer to the weight housing 10 and its mechanism as the auxiliary weight and cooperating means, and to the weight housing 9 and its mechanism as the master weight and cooperating means, it being understood that the auxiliary weight is the one which maintains a uniform pressure by responding to slight variations thereof at any set position, whereas the master weight controls the major changes made in the position of the lever 5 and of the valve.

In Figure 26, 150 represents a fuse box in a suitable electric power line, the output of which is 110 volts for operating the solenoids in the weight housings 9 and 10. The wires 151 and 152 serve all four of the solenoids, the auxiliary solenoids being designated 86 and the master solenoids at 86a. The motor 49 also receives its source of power from these wires. A step-down transformer 153 is also provided in the line from the transformer 150 and the output of this transformer provides for instance, a six volt current for the actuation of the other electrical devices of the apparatus. The circuit from this transformer may be traced through wire 154 and wires 155 and 156 to the movable contact vanes 38 and 38a on the shafts 37 and 37a of the contact makers and breakers for the auxiliary and master weights respectively. From these contact vanes, the circuit may be traced through the fixed contacts 48 and 48a to the electromagnets 67 and 67a respectively. It will also be noted that the electromagnets 67b are also connected in parallel with the electromagnets 67a whereby they operate simultaneously therewith and if the left hand magnet 67a is energized the left hand magnet is simultaneously energized. Similarly with the right hand magnets 67 and 67b, wires 157 and 158 provide the circuit means for the magnets 67b.

With reference to the contact makers and breakers 72 for the auxiliary weight and 72a for the master weight, it may be here stated that these contact makers and breakers are four in number, one for each of the solenoids in the weight housings and that they are of the type many varieties of which are known in the market, which normally have one circuit open and one closed and which when actuated, as by the upward movement of the rods 71 and 71a, operate to close the open circuit and open the closed circuit. It has not been deemed necessary to illustrate the details of this type of circuit maker and breaker as it may take many forms and is well known in the art.

These circuit makers and breakers 72 have been illustrated in Figure 26 with the normally closed contact members as X and the normally open contact members as Y. It will be remembered that upon the upward movement of the rods 71 or 71a, these contact makers and breakers 72 corresponding to such rods are actuated. Assuming therefore that the rod 71, operated by the left hand magnet 67, is actuated, such actuation will cause the left hand circuit maker and breaker 72 for the auxiliary control to close the contacts Y and open the contacts X. It will be noted that the normally closed contact X when opened will open the circuit to the right hand magnet 67 and thus eliminate the possibility of such right hand magnet being energized while the left hand magnet is energized. It will also be obvious that closing the contacts Y of the left hand contact maker and breaker 72 serves to close the circuit to the left hand solenoid 86 of the auxiliary control through the wires 159 and the wires 151 and 152.

Likewise if the rod 71 corresponding to the right hand magnet 67 of the auxiliary control is actuated through energizing such magnet 67, the corresponding contacts Y of the right hand contact maker and breaker 72 will be closed, thus closing the circuit through wires 151 and 152 and wires 160 to the right hand solenoid 86 of the auxiliary control. Also the actuation of this circuit maker and breaker 72 likewise opens the contacts X thereof, thus breaking the circuit to the left hand magnet 67 rendering it impossible for the same to be energized while the right hand magnet 67 is energized.

The wire 161 provides a series circuit connection for all the normally closed contact members X of the contact makers and breakers 72 and with the circuits of the electromagnets 67 and 67a. It will be apparent from a study of the diagram of Figure 26, that if one of the normally open contacts Y has been closed and therefore its corresponding normally closed contact X opened, it will be impossible to close the circuit to the electromagnet opposite from that one which resulted in closing such contact Y, even though the contact vanes 38 should close with the fixed contacts 48 for such opposite magnet.

The operation of these magnets and contact members are identical for both the auxiliary and master controls and further detailed explanation is not deemed necessary.

Wires 162 provide a six volt current through the resistance members 133 on the auxiliary weight device and the resistance members 133a on the master weight device, for the corresponding electrical indicators 135 and 136 and the electrical recorders 137 and 138.

Manually operable switch members 163 and 164 are provided in the solenoid circuits for the weight controls to the auxilary and master weights respectively whereby such weights may be shifted by manual actuation of these switches independent of the automatic control therefor.

There is also provided in combination with the switch 164 a means for the remote control of the master weight whereby the same may be shifted to adjust the valve, from a remote control station, for instance, ten miles away from the valve. This device is illustrated diagrammatically in Figures 26 and 27 where it will be noted that the switch arm 164 is pivoted as at 165 and is normally held in vertical position by means of the leaf springs 166. In such position the contact arm lies between and out of contact with the fixed contacts 167 and 168 which through the circuits as heretofore described cooperate with the contact arm 164 to complete the circuit and actuate either one or the other of the solenoids 86a to shift the master weight in one direction or the other, according to which solenoid is actuated.

Suitably disposed upon each side of the contact arm 164 are the electromagnets 169 and 170, each of which when energized serves to draw the contact arm 164, as an armature, towards such magnet and into engagement with the adjacent contact 167 or 168.

Wires 171 and 171a lead from the magnet 169 to a fixed contact 172 and a pivoted contact arm 173 respectively, disposed at any desired remote point. Likewise wires 174 and 174a lead from the magnet 170 to the fixed contact 175 and the contact arm 173 respectively. This contact arm 173 is a manually operable switch arm adapted to be selectively moved into engagement with either of the fixed contacts 172 or 175 to close the circuit to either the magnet 169 or the magnet 170 depending upon which of the master weight controlling solenoids it is desired to actuate. Any suitable source of current may be provided for the circuits between the magnets 169 and 170 and the contact maker and breaker 172, 173 and 175, such as for instance, a battery 176, or by tapping into a regular line current.

There is also provided at this remote control station where the contact maker and breaker 173 is positioned, electric indicators 177 and 178 of the same type as indicators 135 and 136, both indicating the pressure in the steam line, one being actuated by the rheostat device 132 on the auxiliary weight and the other by the rheostat device 132 on the master weight. Suitable wires 179 are tapped into the circuits of the indicators 135 and 136 and extend to the remotely positioned indicators 177 and 178.

Thus it is obvious that even though an operator may be positioned at any distance from the valve to be controlled, he is able by virtue of the indicators 177 and 178 to observe the pressure in the line and if a change in pressure is desired at any time, and independently of the automatic timer control previously described, such operator merely has to manipulate the contact arm 173 intermittently into and out of engagement with either of the fixed contacts 172 or 175, depending upon whether he desires to increase or reduce the pressure, which will result in energizing the corresponding magnet 169 or 170 which thereupon actuates the contact arm 164 into engagement with the corresponding contact 167 or 168, thus actuating the proper solenoid for shifting the master weight and thus varying the adjustment of the valve.

As before stated the contact arm 164 may be actuated manually and directly if desired and for this purpose it is provided with an insulated finger piece 180 as shown in Figure 27.

As a résumé of the operations and functions heretofore described, let it be assumed that at a given time during the day, say 9 o'clock in the morning, the desired pressure in the outlet pipe 11 of the steam line is 10 lbs. For such pressure the valve 2 is, of course, at the required open position and we will assume that all necessary adjustments have been made of the weights on the lever 5 for that pressure. The roller 100 will at this point be riding upon a straight edge of the timer strip so that no change will take place in the position of the master weight in the housing 9 on the lever 5. With the parts in this position, if any slight increase or decrease in pressure in the pipe 11 occurs for any reason whatever, the pressure gauge will respond to such variation in pressure resulting in operation of the auxiliary weight 82 in the housing 10 to make slight adjustments of the valve to compensate for such pressure variations and to maintain the pressure automatically at the desired 10 lbs.

Assume now that at 6 o'clock in the evening the use of steam from the outlet pipe 11 will be lessened due to closing down the factory for the night, leaving perhaps a requirement for only 5 lbs. of steam for heating purposes through the night. The timer strip will have been so arranged on the sprocket 95 that at 6 o'clock the roller 100 will ride into a notch of a predetermined depth, depending upon the pressure desired at this time. This movement of the roller and its attendant parts, will result in a step by step movement of the weight in the housing 9 through the agency of the parts just described, causing the valve lever 5 to shift its position on its pivot materially and to the extent of closing the valve to permit only 5 lbs. of pressure in the outlet pipe 11. When the roller 100 has reached the bottom of the notch corresponding to this 5 lb. pressure the edge of the timer strip will be again straight and will maintain the roller in that position until the next major change is desired.

It will be understood, of course, that as the pressure is reduced in the manner just described by shifting the master weight in the housing 9, the gauge on the outlet pipe 11 will, of course, respond to such change in pressure and will result in also shifting the auxiliary weight 82 in the housing 10 to a balanced position with respect to the master weight in its new position. In other words, when the change has been completed, the position of the valve lever 5 will have been changed to the new position corresponding to the new pressure and will be balanced in such position the same as before. Likewise if any changes or variations should occur in the pressure in the outlet pipe 11 at this new setting of say 5 lbs., the pressure gauge will show such variations and will automatically actuate through the agencies described, including the auxiliary weight 82 to compensate for and maintain this new pressure.

It will be clear that similarly when the opening of the factory occurs and the requirement for steam pressure again is 10 lbs., the roller will ride upwardly upon the appropriately and timed cam edge of the timer strip resulting in the reverse operation of this control mechanism and restoring the pressure to 10 lbs. in the outlet pipe 11.

The description of the operation of the remote control means for the device previously made is believed sufficiently clear and needs no further amplification in this summary.

It is believed that further detailed description of the operation of the various parts heretofore described is unnecessary as the operation of most of the various elements was set forth with the detailed description thereof.

It will be understood, of course, that many changes may be made in details of construction and arrangement of parts without departing from the spirit and scope of my invention. I do not limit myself, therefore, to the exact form herein shown and described other than by the appended claims.

I claim:

1. In combination with a pressure line, a valve in said line for controlling the pressure therein, a pivoted lever connected thereto for adjusting the position of said valve with respect to its seat, a weight on said lever movable longitudinally thereof in either direction for varying the adjustment of said valve, weight moving means carried by said lever, and pressure actuated electrical means in said line for causing actuation of said weight moving means.

2. In combination with a pressure line, a valve in said line for controlling the pressure therein, a pivoted lever connected thereto for adjusting the position of said valve with respect to its seat, means for automatically maintaining a predetermined pressure in said line comprising a weight on said lever movable longitudinally thereof in either direction for varying the adjustment of said valve, weight moving means carried by said lever, a pressure sensitive element in said line, and electrically actuated means controlled by said pressure sensitive element for actuation of said weight moving means.

3. In combination with a pressure line, a valve in said line for controlling the pressure therein, a pivoted lever connected thereto for adjusting the position of said valve with respect to its seat, two weights on said lever movable longitudinally in either direction for varying the adjustment of said valve, a weight moving means carried by said lever for each weight, a pressure sensitive element in said line, electrically actuated means controlled by said pressure sensitive element for actuating one of said weight moving means to move one of said weights, a predetermining timer means, and electrically actuated means controlled by said timer means for actuating the other of said weight moving means to move the other of said weights.

4. In combination with a valve, a pivoted lever connected thereto for adjusting the position of said valve with respect to its seat, a weight on said lever movable longitudinally thereof in either direction for varying the adjustment of said valve, means carried by said lever for moving said valve, a predetermining timer means remote from said valve, and electrically actuated means controlled by said timer for actuating said weight moving means at predetermined intervals.

5. In combination with a pressure line, a balanced valve assembly in said line for controlling the pressure therein including means for balancing said valve, time controlled means for adjusting said valve at predetermined intervals, a pressure sensitive element in said line, and means actuated by said element for actuating said valve balancing means whereby to maintain the pressure in said line in accordance with said predetermined adjustment.

6. In combination with a pressure line, a balanced valve in said line for controlling the pressure therein, time controlled means for adjusting said valve at predetermined intervals, a pressure sensitive element in said line, and means actuated by said element for adjusting said valve to maintain the pressure in said line in accordance with said predetermined adjustment, said last named means comprising a pivoted lever connected to said valve, a weight on said lever movable longitudinally thereof in either direction, and electric means carried in part by said lever for moving said weight.

7. In combination with a valve, a plurality of means connected with said valve for adjusting the same with respect to its seat, means associated with each of said aforesaid means for actuating the same, time controlled mechanism for actuating one of said actuating means at predetermined intervals, and pressure controlled mechanism for actuating the other of said actuating means independently of said time controlled means.

8. In combination with a valve, a plurality of means connected with said valve for adjusting the same with respect to its seat, means associated with each of said aforesaid means for actuating the same, time controlled mechanism for actuating one of said actuating means at predetermined intervals, and pressure controlled mechanism for actuating the other of said actuating means independently of said time controlled means, both of said actuating mechanisms having a common electric circuit maker and breaker.

9. In combination with a valve, a pivoted lever connected thereto for adjusting the position of said valve with respect to its seat, a weight and a weight moving means carried by said lever and movable longitudinally thereof in either direction for varying the adjustment of said valve, and remotely controlled electrically actuated means for actuating said weight moving means.

10. In combination with a valve, a pivoted lever connected thereto for adjusting the position of said valve with respect to its seat, a weight and a weight moving means carried by said lever and movable longitudinally thereof in either direction for varying the adjustment of said valve, and remotely controlled electrically actuated means for actuating intermittently said weight moving means.

11. In combination a movable controlling member, means for actuating said member including an element arranged for step by step rotation, pressure actuated electrical means for operating said element, and means for actuating said electrical means independent of said pressure actuated means.

12. In combination a movable controlling member, means for actuating said member including an element arranged for step by step rotation, pressure actuated electrical means for operating said element, and means remote from said controlling member for actuating said electrical means independent of said pressure actuated means.

13. In combination with a valve, means connected with said valve for adjusting the same with respect to its seat, said means including an actuable lever arm and means carried thereby for actuating the arm, time controlled mechanism for actuating said adjusting means at predetermined intervals, pressure controlled mechanism for adjusting said adjusting means independently of said time controlled means, and manually controlled means, independent of both said time and pressure controlled means, for actuating said adjusting means.

14. In combination with a valve, means connected with said valve for adjusting the same with respect to its seat, said means including an actuable lever arm and means carried thereby for actuating the arm, time controlled mechanism for actuating said adjusting means at predetermined intervals, pressure controlled mechanism for actuating said adjusting means independently of said time controlled means and remote manually controlled means, independent of both said time and pressure controlled means for actuating said adjusting means.

15. In combination a movable controlling member, means for moving said member including an element mounted for step by step rotation, actuating means for said element including an electric contact maker and breaker comprising two sets of cooperable contacts rotatably mounted one within the other, said contacts being rotatable in either direction without limit, and means for intermittently moving said contacts into and out of engagement with each other to actuate said element step by step, the moving means for said contacts comprising a pressure sensitive member operatively connected to said contact maker and breaker.

16. In combination a movable controlling member, means for moving said member including an element mounted for step by step rotation, actuating means for said element including an electric contact maker and breaker comprising two sets of cooperable contacts rotatably mounted one within the other, said contacts being rotatable in either direction without limit, means for intermittently moving said contacts into and out of engagement with each other to actuate said element step by step, the moving means for said contacts comprising a pressure sensitive member operatively connected to said contact maker and breaker, and additional means, independent of said pressure sensitive means for actuating said contact maker and breaker.

17. In combination a movable controlling member, means for moving said member including an element mounted for step by step rotation, actuating means for said element including an electric contact maker and breaker comprising two sets of cooperable contacts rotatably mounted one within the other, said contacts being rotatable in either direction without limit, means for intermittently moving said contacts into and out of engagement with each other to actuate said element step by step, the moving means for said contacts comprising a pressure sensitive member operatively connected to said contact maker and breaker, and additional means, independent of said pressure sensitive means for actuating said contact maker and breaker, said additional means being time controlled.

18. In combination a movable controlling member, means for moving said member including an element mounted for step by step rotation, actuating means for said element including an electric contact maker and breaker comprising two sets of cooperable contacts rotatably mounted one within the other, said contacts being rotatable in either direction without limit, means for intermittently moving said contacts into and out of engagement with each other to actuate said element step by step, the moving means for said contacts comprising a pressure sensitive member operatively connected to said contact maker and breaker, additional means, independent of said pressure sensitive means for actuating said contact maker and breaker, said additional means being time controlled, and manually operable means, remote from said controlling member and independent of said pressure and time controlled means, for actuating said contact maker and breaker.

FREEMAN H. OWENS.